INVENTOR.
CHARLES P. ROHMANN
ROBERT B. WATROUS
BY
Arthur H. Swanson
ATTORNEY.

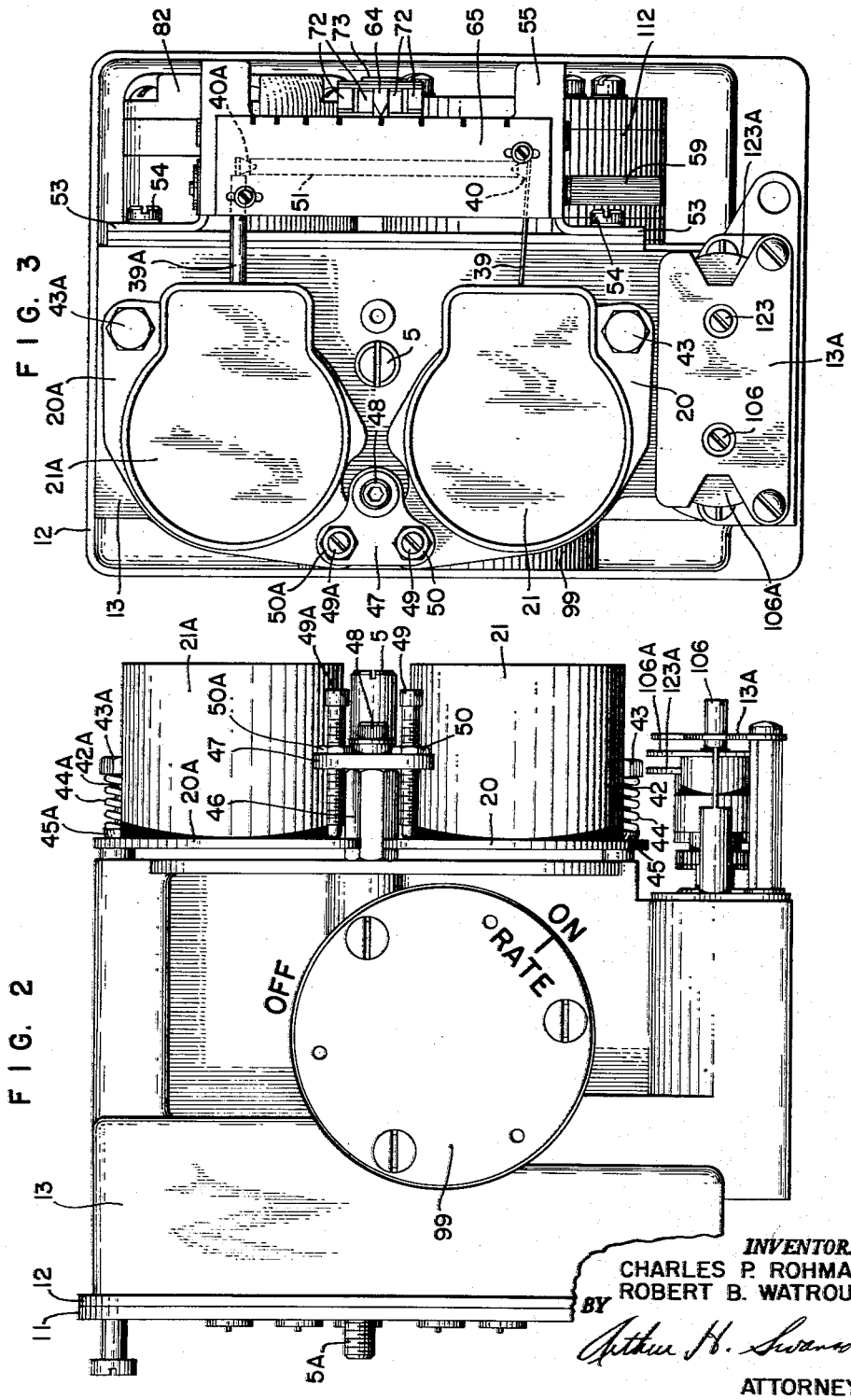

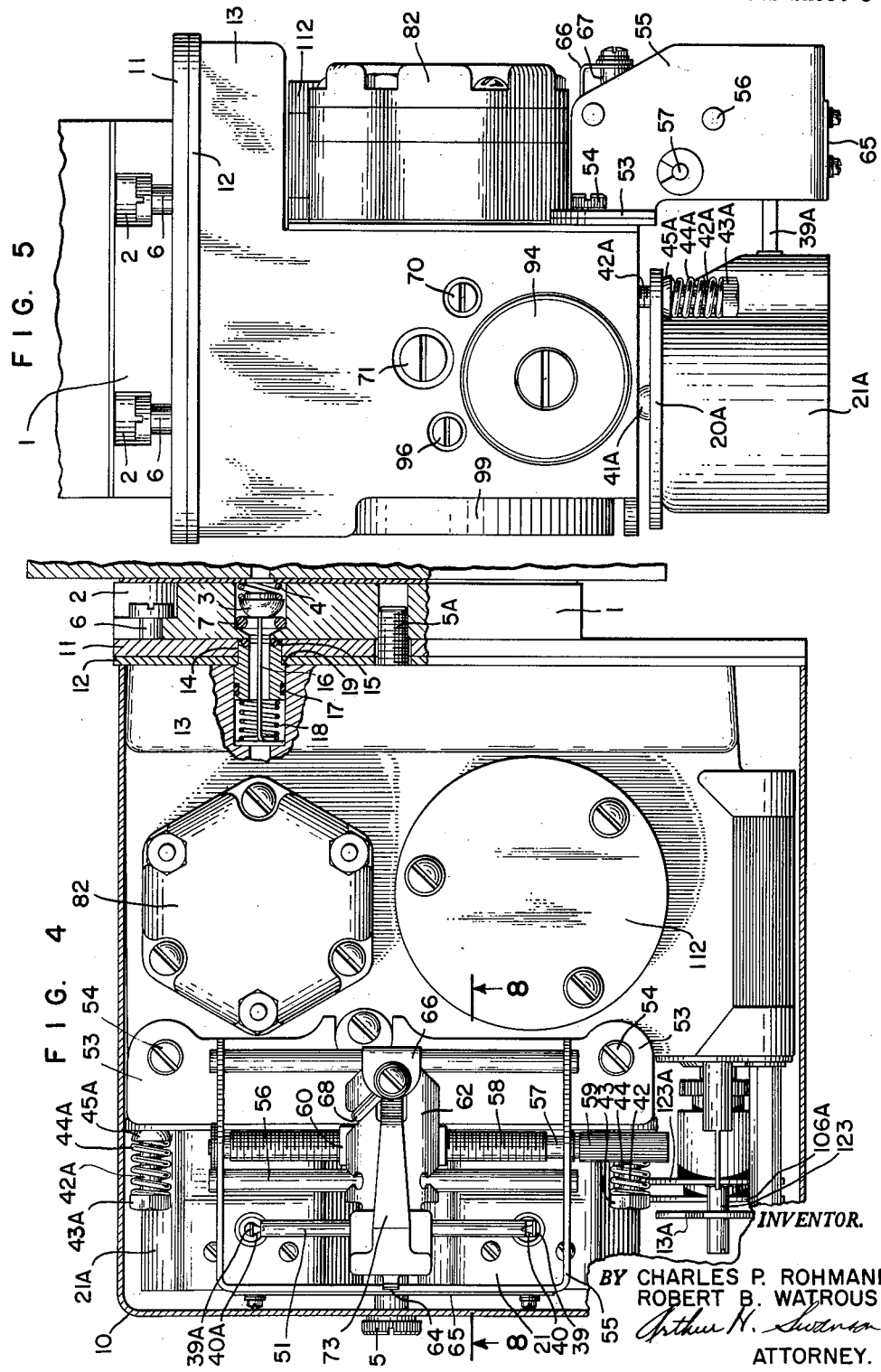

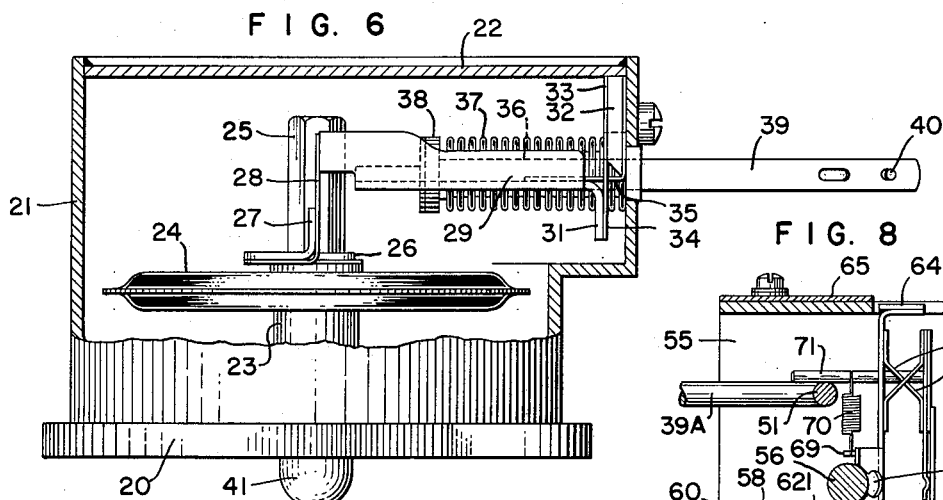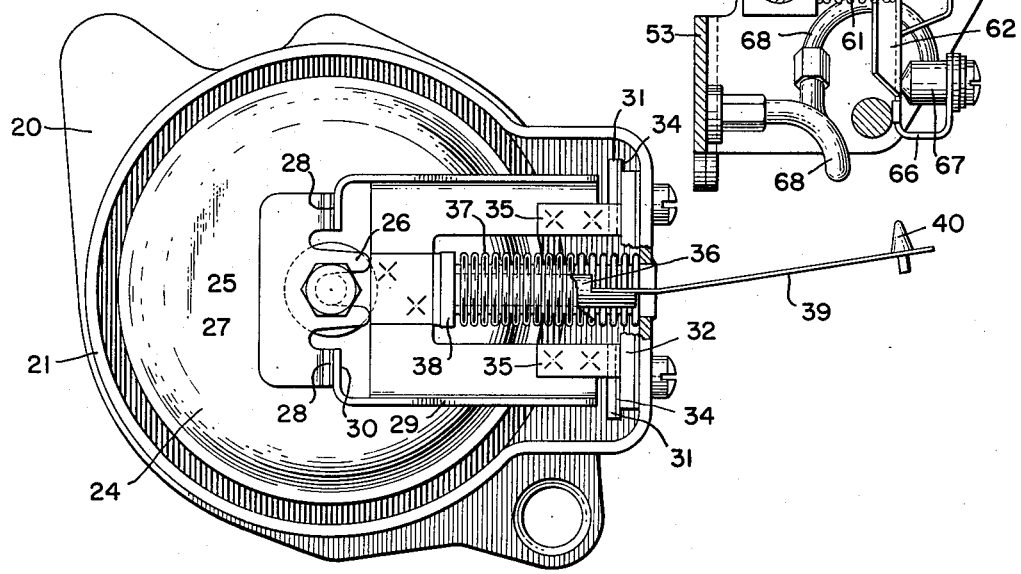

UnitedStates Patent Office 3,099,281
Patented July 30, 1963

3,099,281
AIR-PRESSURE-OPERATED CONTROLLER
Robert B. Watrous, Philadelphia, and Charles P. Rohmann, Hatboro, Pa., assignors to Minneapolis-Honeywell Regulator Company, Minneapolis, Minn., a corporation of Delaware
Filed July 17, 1961, Ser. No. 124,623
19 Claims. (Cl. 137—86)

This invention relates to air-pressure-operated controllers. Such controllers have one or more of the following several different actions or modes of operation including: proportional-position action (alternately known as throttling action), proportional-speed floating action (also known as reset action), and rate action. These controllers also have an adjustable proportional band, i.e., adjustable throttling range. These terms are defined in the publication Mechanical Engineering for February, 1946, republished by the American Society of Mechanical Engineers, 29 W. 39th Street, New York 18, New York, in a pamphlet entitled "Automatic Control Terms." A copy of this pamphlet is in the United States Patent Office. Such controllers may provide two-mode control having proportional action and automatic reset action or may provide three-mode control having proportional, automatic reset, and rate actions.

A conventional two-mode controller corrects the controlled output pressure in accordance with:

(1) Proportional action, which is a mode of operation in which the size of a deviation of the process variable (hereinafter referred to as PV) from the selected set point (hereinafter SP) and (2) Automatic reset action which corrects for the offset (sometimes called droop) produced by changes in the load or set point. Automatic reset varies in accordance with the duration of the time of a given deviation between the process variable and set point.

A three-mode controller provides rate action in addition to the proportional and reset actions explained above. Rate action corrects the controller output according to the speed and direction with which the deviation changes (a constant deviation produces no rate correction).

The controller of this invention has a movable element which is subject to both the process variable and set point pressures and a second movable element which is subject to positive feedback pressure and to negative feedback pressure. It is an object of this invention to provide that, when the controller is in the steady state or balanced condition, these movable elements are always relaxed (unloaded) because the movable elements are subjected to an equal pressure on each face thereof.

Another object of this invention is to provide a controller designed to insure a drift-free operation because the movable elements are made of material which remains stable in spite of change in temperature.

An additional object of this invention is to provide a controller which will resist corrosion in atmospheres containing the vapors of concentrated refinery hydrocarbons, sulphur, chlorine, ammonia, caustics, acids and the like.

A further object of the invention is to provide a controller having valves and actuators which open the passages which supply air to the controller, when the controller is mounted in the position which it is to occupy, or which cut off air from the controller, when the controller is removed from this position.

Yet another object of this invention is to provide means for insuring that the proportional band adjustment operates properly by mounting the movable element of the controller so that the drive shaft, which forms part of the differential, can be aligned with the axis along which the proportional band adjustment is made.

A still further object of this invention is to provide an air-pressure-tight capsule in which is mounted a movable element in the form of a bellows actuating a beam mounted in the capsule by means of a cross spring pivot.

It is likewise an object of this invention to provide a mechanical differential between the two movable elements of the controller.

An additional object of this invention is to provide a proportional band adjustment which is simple and easy to operate.

An additional object of this invention is to provide a controller having a cutout relay of novel design.

Another object of this invention is to provide a controller having a rate unit of novel design.

A better understanding of the present invention may be had from the following detailed description when read in connection with the accompanying drawings, in which:

FIG. 2 is an elevation of the left side of the controller.

FIG. 3 is an elevation of the front of the controller.

FIG. 4 is an elevation of the right side of the controller.

FIG. 5 is a top or plan view.

FIG. 6 is a side elevation of a capsule with parts broken away in vertical cross section.

FIG. 7 is a top or plan view of the capsule shown in FIG. 6 with the cover removed.

FIG. 8 is a vertical cross section on line 8—8 of FIG. 4 as viewed in the direction of the arrows and showing the proportional band adjustment.

Figure 1:
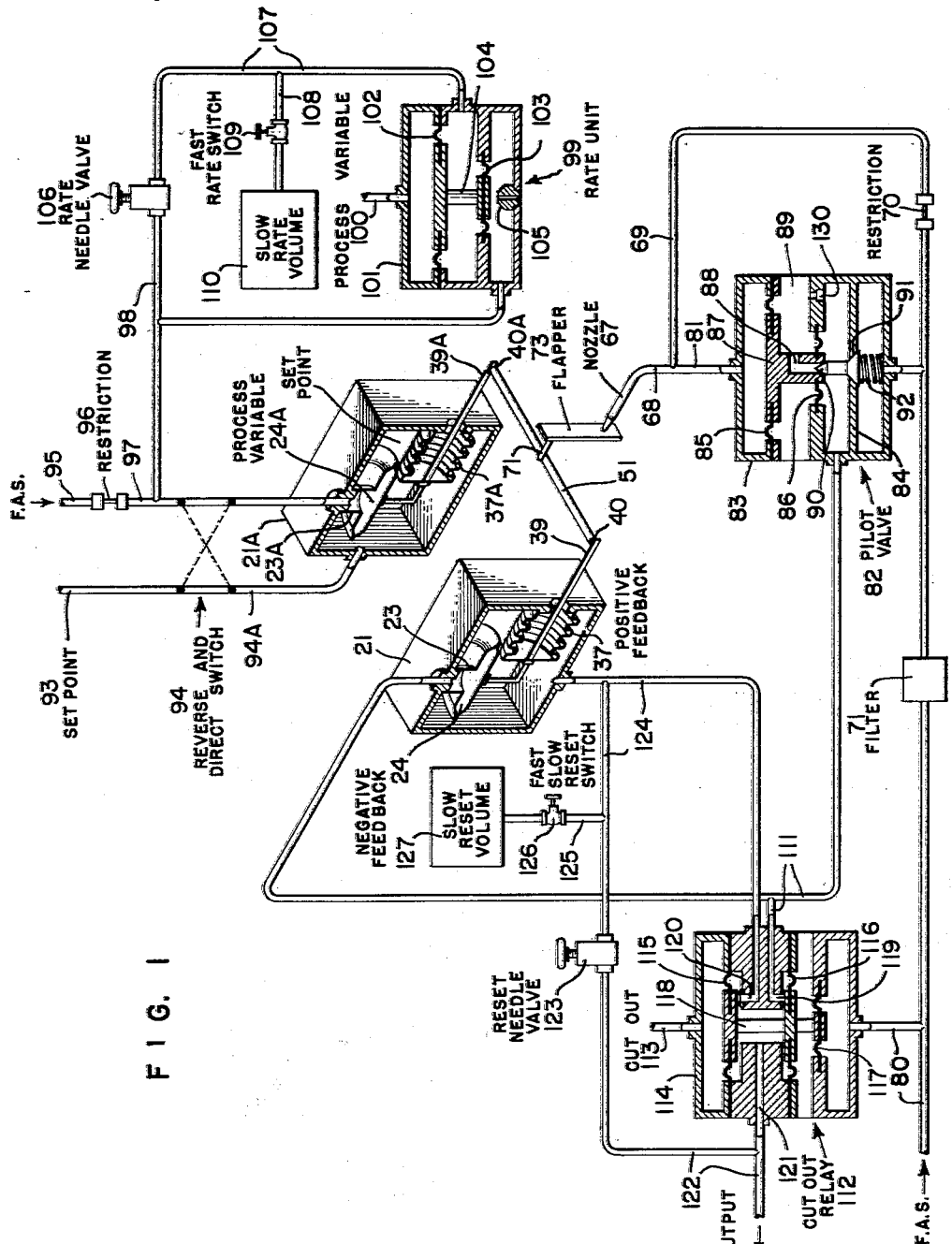
FIG. 1 is a pneumatic circuit diagram with parts shown in cross section and in perspective.

The controller of this invention is adapted to be mounted in one of the following three positions:

On a control station at which the actuating elements for the process are located; on a rack mounted near the station; or in the field near the final control valve operated by the controller.

Referring to FIG. 4, the integral mounting on a control station is shown. This mounting comprises a manifold 1 having slots 2 in it and passages passing through it each controlled by a movable valve 3 stressed by a spring 4 against a ring-shaped washer 7. Studs 6 are mounted on the back of cover plate 11 and are hooked into the corresponding slots 2 in mounting manifold 1. Studs 6 support the controller and line up the matching pressure connections. On the opposite face of cover plate 11 is a gasket 12 which contacts with one face of base casting 13 on which the controller components are mounted. A dust- and weather-proof cover 10 is attached to a base casting 13 by a single mounting bolt 5 which has a screw driver slot exposed at the front of the controller and which has a screw-threaded engagement with the manifold 1 at the rear of the controller.

Base casting 13 is connected to manifold 1 by a bolt 5A.

The base casting 13 has a number of openings through it through which the air passes to the various parts of the controller. But one of these openings and but one of the valve-actuating elements located therein need be described. This valve-actuating element comprises a tube 14 having a shoulder thereon having at its outer end a sealing ring 15. Tube 14 is sealed to the wall of the opening by rings 17. The valve actuator proper is comprised of a rod 16 formed in a ring at its left end, as seen in FIG. 4, and stressed against the wall of the base casting 13 by a spring 18.

When the controller is placed on manifold 1 by placing studs 6 in slots 2, the bolt 5A is tightened and actuator 16 engages valve element 3 and lifts it out of engagement with sealing ring 7 against the stress of spring 4 and thereby opens the passage through manifold 1 and base casting 13. The reverse action takes place when the controller is removed from manifold 1.

The controller contains two capsules which are duplicates so that a description of one will suffice. The capsule 21 to which the positive and negative feedback pressures are fed will be described. The PV–SP capsule is a duplicate having corresponding elements to which the same reference characters are applied distinguished by the addition of the letter A.

Referring to FIGS. 6 and 7, it will be seen that the capsule comprises a base 20, a sidewall 21 secured thereto and a top 22 secured air-tight to the top of the sidewall 21. On the base 20 is mounted a hollow tube 23 to which is secured the movable element 24 formed of a pair of discs connected together at their rims so as to provide a bellows having a hollow interior. On the upper disc is mounted a nut 25 which bears against a pair of tongues 26 so as to secure an element 27, which is substantially L-shaped as viewed in FIG. 6, to the movable portion of the element 24. A pair of uprights 28 attach element 27 to rigid element 29 by means of bent ears 30.

Rigid element 29 is connected, at its right end, by means of a pair of bent ears 31 to one end 34 of a vertical element of a cross spring pivot. The other end 33 of this vertical element is secured to a plate 32 attached to the vertical wall 21 of the capsule. The horizontal member 35 of the cross spring pivot is secured to the rigid element 29 at 36. The connection between uprights 28 and ears 30, between ears 31 and vertical element 33—34, between ends 33 of the vertical pivot and plate 32, and the connection between horizontal pivot 35 and rigid element 29 may be formed by spot welding or the like.

Sealing bellows 37 is secured, at its right end, to wall 21 of the capsule and at its left end by means of disc 38 to beam 39. Beam 39 is thus mounted to rock about the cross spring pivot. In effect, the rigid element 29 and the beam 39 form a single lever, its inner end actuated by the movable element 24 and the outer end, on which is mounted a cone 40, outside of the capsule.

It will be obvious that any difference between the pressure of the air applied to the inside of the element 24 and the air applied to the outside of the element 24 will cause element 24 to expand or contract and thereby rock beam 39 about the cross spring pivot.

Means are provided for adjusting either end of the whiffle tree formed of drive rod 51 by adjusting the cones 40 and 40A vertically. These means are best seen in FIGS. 2, 3, 4, 5 and 6. Since these means are, at least in part, duplicates they will be described in connection with the PX–SP capsule. Base 20A of the PV–SP capsule 21A has a pair of hemispheres 41A on it. Only one of these hemispheres can be seen in FIG. 5, the other being located directly behind it. A screw 42A passes through a hole in base 20A. The head 43A of screw 42A engages one end of spring 44A which bears at its opposite end on the flat face of hemisphere 45A bearing in a corresponding opening in base 20A. As is best seen in FIGS. 2 and 3 base casting 13 has a nut 46 on it, to the upper end of which is secured a triangular plate 47 by means of a nut 48. Through plate 47 passes screw 49 which bears on base 20 of capsule 21 and screw 49A which bears on base 20A of capsule 21A. Since screws 42A and 49A are located on the opposite sides of the pivot for capsule 21A which is formed by the hemispheres 41A, the left end of screw 49A, which engages with base 20A, forms a ground from which the tilt of base 20A can be adjusted by turning the screw 49A. Screw 42A is then adjusted so as to vary the tension which the spring 49A exerts of the base 20A. The tilt of base 20A relative to base casting 13 determines the tilt of beam 39A and, consequently, the location of the end of whiffle tree formed by the engagement between the cone 40A and the corresponding end of the drive rod 51.

The differential (FIGS. 1, 3 and 4) comprises a drive rod or whiffle tree 51 having openings in its ends into which the cones 40 and 40A fit. The feedback beam 39 acts as a cantilever spring to hold the rod 51 firmly against the rigid PV–SP beam 39A.

The proportional band adjustment is best seen in FIGS. 3, 4 and 8. This proportional band adjustment comprises a support 53 mounted on the base casting 13 by screws 54. A C-shaped bracket 55 supports the ends of a guide rod 56 and an adjusting screw 57 having screw threads 58 and a manually operable, knurled end 59. Threads 58 mate with threads on nut 60 which carries pin 61. Spring 621 engages support 62 at the right and engages nut 60 at the left. The right end of pin 61 engages with support 62 having notches 63 in it which engage with and slide along stationary pin 56. Support 62 carries at its top a pointer 64 which cooperates with a stationary scale 65 secured to the top of C-shaped bracket 55. Scale 65 is calibrated on both faces with two sets of markings. One set is in percentage of proportional band, the other in gain. One face is used with fast reset. The other face is used with slow reset. At its bottom, support 62 carries U-shaped bracket 66 which supports hollow nozzle 67 to which air is conducted by flexible conduit 68. Support 62 also carries pin 69 secured to one end of helical spring 70 the opposite end of which is attached to actuating pin 71 which rides along the upper surface of drive rod 51. The right end of pin 71 is secured to flapper 73 which pivots about cross spring pivot 72 and cooperates with the left end of nozzle 67 so as to control the back pressure of the air within the nozzle 67.

Rotation of knob 59 causes threads 58 to move nut 60, and consequently support 62 and pin 71, horizontally so that the point of engagement between the drive rod 51 and pin 71 is adjusted. Therefore, the distance between beam 39 and pin 71 and between beam 39A and pin 71 is varied. This varies the operative point of the whiffle tree formed by the drive rod 51 and varies the amount of motion of beam 39 and of beam 39A necessary to move flapper 73.

The pressure in nozzle 67, as controlled by flapper 73, may be passed directly to conduit 111 without the use of pilot valve 82. However, it is preferred to use pilot valve 82 which amplifies the nozzle pressure in the ratio of one-to-five.

FIG. 1 shows how the pressure within nozzle 67 and within flexible connection 68, which leads thereto, controls the operation of pilot valve or relay 82. A supply of compressed air is led from a source 80 of filtered air (F.A.S.) through filter 71, restriction 70, and conduit 69 to flexible connection 68 which leads to nozzle 71. Pilot valve 82 is divided into four airtight chambers or compartments by rigid wall 84 and by flexible diaphragms 85 and 86. Connection 81 leads air, at a pressure determined by the position of flapper 73 relative to nozzle 67, to a chamber having diaphragm 85 as one movable wall thereof. A block 87 is mounted on diaphragms 85 and 86 and has a perforation 88 passed therethrough. One end of perforation 88 cooperates with exhaust valve 90 to exhaust air from the chamber, which has the diaphragm 86 as a movable wall thereof and from which the bleed 130 leads, to the atmosphere through the outlet 89. Air from source 89 and filter 71 passes to the chamber which has the rigid wall 84 as one wall thereof. This air is admitted to the pilot valve 82 whenever the pressure of the air applied to the upper face of diaphragm 85 is sufficient to overcome the pressure of the air applied to the lower face of diaphragm 86 plus the pressure of spring 92 which holds in that valve 91 and exhaust valve 90 in their normally closed position.

Air at a pressure which forms the set point or datum from which the deviations of the control are measured is fed through pipe 93, switch 94, and connection 94A to the interior of PV–SP capsule 21A. Air at a pressure corresponding to the instantaneous value of the process variable is led directly to the interior of the movable element 24A when the controller is operating as a two-mode controller.

In FIG. 1 however, the controller is shown as operating accordingly in the three-mode manner 9. In such a style of operation, air at a pressure corresponding to the instantaneous value of the process variable is fed through conduit 100 to that chamber of the rate unit 99 which has the diaphragm 102 as a movable wall thereof. The rate unit 99 has a rigid case 101 which is divided into three chambers by diaphragms 102 and 103 which are attached together by a rod 104. Diaphragm 103 controls the escape of air from the lowest chamber of the rate unit 99 through a bleed formed by a nozzle 105. Compressed air from a source 95 (F.A.S.) passes through restriction 96 and connections 97 to the chamber which has movable diaphragm 103 as a wall thereof. This air also passes through connection 98, rate needle 106, and connection 107 to the chamber between the diaphragms 102 and 103. A branch connection 108 leads from connection 107 through switch 109 to a closed chamber 110.

The output air pressure from the pilot valve 82 passes through conduit 111 directly to the interior of the movable element 24 of the capsule 21. This constitutes the negative feedback pressure.

The conduit 111 also leads to the valve comprised by port 119 and diaphragm 116 which is shown closed in FIG. 1. This valve comprises a part of the cutout relay 112 which has a rigid case divided into four compartments by diaphragms 115, 116, and 117 which are connected together and move as one by means of a rod 118. Air at a pressure, which is operable to control relay 112, manually variable, is fed through the inlet connection 113 to the upper chamber which has the diaphragm 115 as a movable wall thereof. Diaphragm 115 cooperates with valve port 120 to provide a second valve which controls the inlet or exhaust of air under pressure between the diaphragms 115 and 116.

The air is taken from this chamber by means of conduits 121 and 122 and applied to the final control element (not shown) connected to the output. This final control element is usually an air-pressure-operated valve. This conduit 122 also leads to a reset needle valve 123 and through a conduit 124 to the outside of the movable element 24 forming part of the capsule 21. The air applied to the outside of the movable element 24 provides the positive feedback pressure which is also applied through valve 115—120 to the chamber between the diaphragm 115 and the diaphragm 116. A conduit 125 leads through a reset switch 126 to a closed chamber 127 which forms the slow reset volume.

FIGS. 2 and 4, and particularly FIG. 3, show that base casting 13 has a cover plate 13A attached to it and provided with notches at its ends. These notches expose portions of dial 106A attached to rate needle valve 106 and of dial 123A attached to reset needle valve 123. Dials 106A and 123A are calibrated on both faces. The range of adjustment of rate needle valve 106 and of reset needle valve 123 can be changed without replacement of parts by opening or closing rate switch 109 or reset switch 126 (FIG. 1). That face of dial 106A and of dial 123A is used which corresponds to the open position of the switch 109 or of the switch 126, respectively, or to the closed position thereof.

The operation of the controller will be explained on the assumption that the control station from which the set point pressure and the cutout pressure which actuates the cutout relay 112 are supplied includes a recorder and that the final control element attached to conduit 122 is an air-pressure-operated valve.

The controller may be made direct or reverse-acting by positioning switch 94. The controller is shown in the reverse acting position and will decrease the controlled output pressure when the process variable pressure increases.

PV-SP capsule 21A receives two input pressures representing the process variable and the set point. In a two-mode controller, the PV signal goes directly to the capsule 21. In a three-mode controller which is illustrated, the PV signal is applied to the rate unit 99. When the pressure of the PV signal changes, the rate unit 99 transmits a modified signal (PV1) to the PV–SP capsule as long as the change continues. As soon as the PV signal stops changing, the PV1 signal begins to die out. The differential across the PV–SP capsule positions the flapper 73 on the nozzle 67 of the pilot valve 82. Pilot valve 82 converts small changes in nozzle back pressure to significant changes in controlled output pressure. Air at the controlled output pressure goes through conduit 111 through the cutout relay 112 to the positive feedback pressure line 122. This air also goes directly to the negative feedback chamber of the feedback capsule 21. The positive feedback chamber of the feedback capsule 21 is connected to the output pressure line 122 through the reset needle valve 123. As long as there is any difference between the positive and negative feedback pressures, the controller output pressure in conduit 122 will continue to change. The ultimate change in the output pressure is thus proportional to the size of the deviation and to the length of time it has lasted.

The controller shown herein, particularly in FIGS. 1 and 8, is a reverse-acting controller. "Reverse-acting" means that an increase in the PV pressure in the interior of the hollow, movable element 24A will cause a decrease in the pressure in the pipe 111 which forms the output from the pilot valve or relay 82. The way in which the controller operates to achieve this result is as follows.

An increase in the PV pressure applied to the upper face of the movable element 24A moves the inner end of the PV–SP beam 39A downward and moves the outer end of the PV–SP beam 39A upward. The resulting upward movement of the outside end of the beam 39A causes the right end of the drive rod 51 to move upward and to lift the pin 71 which overlies the middle portion of the drive rod 51. Upward movement of the middle of the drive rod 51 moves the pin 71 upward, about its crossed spring pivot 72, as seen in FIG. 8, and consequently rotates the flapper 73 away from the nozzle 67. Movement of the flapper 73 away from the nozzle 67 decreases the nozzle back pressure applied to the upper face of the diaphragm 85 of the pilot valve or relay 82. This decrease in pressure opens the exhaust valve 88 while the inlet valve 91 remains closed. Therefore the output pressure of the pilot valve or relay 82 in the pipe 111 is reduced.

This reduced pressure in the pipe 111 is applied to the upper surface of the movable element 24 of the feedback capsule. The decrease in the pressure applied to the upper surface of the movable element 24 causes the inner end of the feedback beam 39 to move upward. The outer end of the feedback beam 39 moves downward and moves the left end of the drive rod 51 down. This downward movement of the middle portion of the drive rod 51 moves the pin 71 and consequently the flapper 73 counter-clockwise, as seen in FIGS. 1 and 3. This counter-clockwise movement of the flapper 73 causes the flapper 73 to approach the nozzle 67 and to increase the pressure applied to the upper surface of the diaphragm 85 opens the inlet valve 91 while the exhaust valve 88 remains closed. This causes an increase in the pressure in the pipe 111 which is the output pressure from the pilot valve or relay 82.

Therefore, the effect of a decrease in the pressure applied to the upper surface of the movable element 24 is to cause a change in the pressure in the pipe 111 in the direction opposite to the change in the pipe 111 caused by the change in the process variable pressure as applied to the upper surface of the movable element 24A. Therefore, the changes in the pressure applied to the upper surface of the movable element 24 are opposite in direction to the changes in the pressure in the process variable chamber applied to the upper surface of the movable element 24A. This is referred to as negative feedback. The net change in the controlled pressure is proportional to the deviation of the process variable with respect to the selected proportional band setting.

Simple proportional control produces a definite controlled air pressure, and a corresponding valve position, for each value of the PV pressure within the proportional band. If a sustained load change requires a different valve opening to maintain the process variable at the set point, proportional action will make the output pressure different from that required. Automatic reset corrects this offset by continuing to change the output pressure as long as there is any deviation from the required value.

In this controller, the reset needle valve 123 is located in a feedback passage 122 between the output pressure line 121 and the outer or positive feedback chamber of the feedback capsule 21. As long as the output pressure remains away from the required value, the pressures across this capsule are unequal. Air will continue to bleed through the reset needle valve 123 until the pressure in the positive feedback chamber matches the changed pressure in the inner or negative feedback chamber. An increasing reset pressure moves the outer end of the feedback beam 39 and the left end of the drive rod 51 downward, rotating the flapper 73 in the direction of the initial change. The resulting change in controlled output pressure re-sets the control valve to bring the output pressure back to the required value.

In a three-mode controller the PV pressure goes directly to the top chamber of the rate unit 99. When this signal remains constant, it is transmitted unaltered by the rate unit to the PV–SP capsule 21A.

An increasing PV pressure acts downward on diaphragm 102 of rate unit 99 moving the rod 104 down and carrying the diaphragm 103 toward the nozzle 105 in the bottom chamber. Because diaphragm 102 has ten times the area of diaphragm 103, nozzle pressure PV1 must increase ten times to move the rod up and rebalance the rate unit. The resulting proportional-plus-rate increase in output pressure leads the proportional response alone by the reading of the rate time dial. The control valve is thus repositioned that much sooner.

At the moment the back pressure on rate nozzle 105 increases, it also begins to bleed back through the rate needle valve 106 into the center chamber of rate unit 99. Bleed continues until the pressure in all three chambers is the same. If there is no further change in the PV pressure, the rate unit again acts as a one-to-one relay, transmitting an unaltered PV signal to the capsule 21A.

The reset switch 125 is used to open or close off a small volume chamber 127 opening into the reset feedback passage 124. In three-mode controllers, a second switch 109 opens or closes a similar volume chamber 110 opening into the passage 107 between the rate needle valve 106 and the center chamber of the rate unit 99. These switches can be turned from the back of the control unit. With either switch fully closed, the volume chamber in that passage is bypassed to provide the faster rates of reset and rate time indicated on the "fast" side of these dials. With either switch fully open, the volume chamber provides the necessary capacity in that passage to slow the time constant of reset or rate bleed down to the selected "slow" dial setting.

We claim:

1. In an air-pressure-operated controller, a base casting, a pair of hemispheres engaging with said casting and forming a rocking pivot, a base mounted on said hemispheres for rocking motion on said casting, an air-pressure-tight capsule mounted on said base, a flexible bellows located within said capsule and dividing the interior of said capsule into two separate chambers, a cross-spring pivot mounted on said capsule, a beam mounted on said pivot for rocking movement and projecting through a wall of said capsule the projecting portion of said beam forming the output element of the controller, a connection between a movable portion of said bellows and one portion of said beam, a sealing bellows sealing said beam to said capsule, a spring connected between said casting and said base and biasing said base and said capsule for rocking movement about said hemispheres in one direction, and a screw located between said casting and said base and limiting the rocking movement of said capsule about said hemispheres.

2. In an air-pressure-operated controller, a base casting, a pair of air-pressure-tight capsules mounted on said casting, a pair of active elements one located in the interior of each of said capsules and dividing it into two compartments, a pair of beams each pivotly mounted on a separate one of said capsules and projecting through the wall thereof, a pair of connections each between one of said active elements and the inner end of one of said beams, and a drive rod mounted on and having pivotal connection with the outer end of each of said beams and forming the output element of the controller.

3. In an air-pressure-operated controller, a base casting, a pair of air-pressure-tight capsules each mounted on said casting, a pair of flexible bellows each mounted in a separate one of said capsules and dividing the interior thereof into two compartments, a pair of beams each pivotly mounted on and extending through the wall of a separate one of said capsules, one of said beams being relatively rigid and the other of said beams being relatively flexible, a pair of connections each between one of said bellows and one of said beams, and a drive rod mounted on the outer end of each of said beams and having pivotal connection therewith and stressed by said relatively flexible beam against said relatively rigid beam and forming the output element of the controller.

4. In an air-pressure-operated controller, a base casting, a pair of air-pressure-tight capsules mounted on said casting, a pair of flexible bellows each mounted in a separate one of said capsules and dividing the interior thereof into two compartments, a pair of beams each pivotly mounted on a separate one of said capsules and projecting through the wall thereof, a pair of connections each located between one of said bellows and the inner end of one of said beams, a drive rod mounted on the outer end of each of said beams and having pivotal connection therewith, a flapper engaging said drive rod for rocking movement about a pivot in response to movements of said drive rod, a nozzle mounted for cooperation with said flapper, and means for moving said flapper lengthwise of said drive rod for adjusting the proportional band of the controller.

5. In an air-pressure-operated controller, a base casting, a pair of air-pressure-tight capsules each mounted on said casting, a pair of beams each pivotly mounted on a separate one of said capsules and projecting through a wall thereof, a pair of flexible bellows each mounted in a separate one of said capsules and dividing the interior thereof into two compartments, a pair of connections each connecting one of said bellows to one end of one of said beams, a drive rod mounted on and having pivotal connection with the outer end of each of said beams for movement in response to movement of said beams, a flapper having engagement with said drive rod for rocking movement about a pivot, a nozzle mounted for cooperation with said flapper, and a restriction adapted for connection to a supply of compressed air for supplying air to said nozzle.

6. In a controller according to claim 5, a pilot valve connected under the control of the supply of air of said nozzle.

7. In a controller according to claim 5, a cutout relay including a valve controlling a supply of air under the control of the air in said nozzle.

8. In air-pressure-operated controller, a base casting, a pair of air-pressure-tight capsules each mounted on said casting, a pair of flexible bellows each mounted in a separate one of said castings, one of said bellows dividing one of said capsules into a process variable chamber and a set point chamber, the other of said bellows dividing the other of said capsule into a negative feedback chamber and a positive feedback chamber, a pair of beams each pivotly mounted on and projecting through the wall of a separate one of said capsules, a pair of connections each connected between one of said bellows and the inner end of one of said beams, a drive rod mounted on and having pivotal connection with the outer end of each of said beams for movement in response to movement of each of said beams, a flapper having the engagement with the drive rod for rocking movement about a pivot, a nozzle cooperating with said flapper, a restriction connected to a supply of air under pressure and supplying air to said nozzle, a connection between a supply of air controlled by the pressure of the air in said nozzle and leading to the negative feedback chamber of said one capsule, and a needle valve connected on one side to said supply of air under the control of the pressure of the air in said nozzle and connected on the other side to the positive feedback chamber of said one of said capsules.

9. In an air-pressure-operated controller, a base casting, a pair of air-pressure-tight capsules mounted on said casting, a pair of flexible bellows each mounted in a separate one of said capsules, one said bellows dividing one of said capsules into a process variable chamber and a set point chamber, the other said bellows dividing the other of said capsules into a negative feedback chamber and a positive feedback chamber, a pair of beams each pivotly mounted on and projecting through a wall of a separate one of said capsules, a pair of connections each located between one of said bellows and the inner end of one of said beams, a drive rod mounted on and having pivotal connection with the outer end of each of said beams so as to be moved by movement of said beams, a flapper having engagement with the drive rod for rocking movement of said flapper about a pivot, a nozzle cooperating with said flapper, a restriction adapted for connection to a supply of air under pressure and supplying air to said nozzle, a connection between a supply of air under the control of the pressure of the air in said nozzle and in the negative feedback chamber of one of said capsules, a reset needle valve connected on one side to the supply of air under the control of the pressure of the air in said nozzle and connect on the other side to the positive feedback chamber of said one capsule, a closed chamber providing a reset volume, and a reset switch connected between the positive feedback chamber of said one capsule and said closed chamber and controlling the passage of air to said closed chamber.

10. In an air-pressure-operated controller, a base casting, a pair of air-pressure-tight capsules mounted on said casting, a pair of flexible bellows each mounted in a separate one of said capsules, one of said bellows dividing one of said capsules into a process variable chamber and a set point chamber, the other of said bellows dividing the other of said capsules into a negative feedback chamber and a positive feedback chamber, a pair of beams each pivotly mounted on and projecting through the wall of a separate one of said capsules, a pair of connections each connected between one of said bellows and the inner end of one of said beams, a drive rod mounted on and having pivotal connection with the outer end of each of said beams for movement in response to movement of each of said beams, a rate unit comprising a rigid casing having three compartments in the interior thereof, a nozzle passing through the wall of one of said compartments, a restriction adapted for connection to a supply of compressed air and connected to the compartment of said rate unit containing said nozzle and to the process variable chamber of said one capsule, a rate needle valve connected on one side to said restriction to the process variable chamber of said one capsule and to said compartment of said rate unit containing said nozzle and connected on the other side to a second chamber of said rate unit, and an inlet connection leading to the third compartment of said rate unit.

11. In air-pressure-operated controller, a base casting, a pair of air-pressure-tight capsules each mounted on said casting, a pair of flexible bellows each mounted in a separate one of said castings, one of said bellows dividing one of said capsules into a process variable chamber and set point chamber, a conduit conducting process variable pressure to said process variable chamber, a conduit conducting set point pressure to said set point chamber, a switch connected to said conduits so as to reverse the pressures supplied thereto, a pair of beams each pivotly mounted on and extending through the wall of a separate one of said capsules, a pair of connections each connecting one of said bellows to one end of one of said beams, and a drive rod mounted on the outer end of each of said beams and having pivotal connection therewith and forming the output element of the controller.

12. In air-pressure-operated controller, a base casting, an air-pressure-tight capsule mounted on said casting, a flexible bellows located within said capsule and dividing the interior of said capsule into two separate chambers, a cross-spring pivot mounted on said capsule, a beam mounted on said pivot for rocking movement and projecting through a wall of said capsule, a pair of flat flexible strips connected between a movable portion of the bellows and one portion of said beam, and a sealing bellows sealing said beam to said capsule.

13. In an air-pressure-operated controller, a base casting, a pair of air-pressure-tight capsules each mounted on said casting, a pair of flexible bellows each mounted in a separate one of said capsules and dividing the interior thereof into two compartments, a pair of beams each pivotally mounted in a separate one of said capsules and projecting through the wall thereof, a pair of connections each located between one of said bellows and the inner end of one of said beams, a drive rod mounted on the outer end of each of said beams and having pivotal connection therewith, a support mounted on said casting for longitudinal movement in a plane substantially parallel to said drive rod, a flapper pivotally mounted on said support and engaging said drive rod for rocking movement about said pivot in response to movement of said drive rod, and a nozzle mounted on said support for cooperation with said flapper.

14. In an air-pressure-operated controller, a pair of pivots, a pair of beams each mounted on one of said pivots and operable in response to the difference between two pressures applied thereto and rocked thereby in a plane adjacent the plane of movement of the other beam, and a drive rod mounted on and having pivotal connection with the end of each of said beams and forming the output element of the controller.

15. In an air-pressure-operated controller, a pair of means each responsive to the difference between two pressures applied thereto, a pair of pivots, a pair of beams each mounted on a separate one of said pivots and rocked by one of said means in a plane adjacent the plane of motion of the other of said beams, drive rod pivotly connected to the end of each of said beams and operable thereby, and means controlling the pressure of a supply of air and mounted so as to be actuated by an intermediate portion of said beam.

16. In an air-pressure-operated controller, first means responsive to the difference between two pressures applied thereto, means applying a substantially constant set point pressure to said first means, means applying a pressure varying according to a process variable to said first means in opposition to said set point pressure, rate means varying the pressure applied to said first means by said means varying according to said process variable according to the speed and direction of the process variable pressure, second means responsive to the difference between two pressures applied thereto, a pair of beams each forming part of a separate one of said pressure responsive means and movable thereby in a plane adjacent to the plane of movement of the other of said beams, and a drive rod connected to the end of each of said beams and operated thereby and forming the output element of the controller.

17. In an air-pressure-operated controller, a base casting of aluminum, a pair of air-pressure-tight capsules of stainless steel mounted on said casting, a pair of active elements of nickel alloy which remains stable in charging temperatures one located in the interior of each of said capsules and dividing it into two compartments, a pair of beams each pivotly mounted on a separate one of said capsules and projecting through the wall thereof, a pair of connections each between one of said active elements and the inner end of one of said beams, and a drive rod mounted on and having pivotal connection with the outer end of each of said beams and forming the output element of the controller.

18. In an air-pressure-operated controller, a manifold having a passage passing through it, a movable valve located in said passage and controlling the flow of air therethrough, a spring biasing said valve to its closed position, a base casting having a passage through it cooperating with the passage in said manifold, a valve actuator mounted in the passage in said base casting and adapted to engage the valve in said manifold when said casting is mounted on said manifold, a bolt interconnecting said manifold and said casting and causing said actuator to open said valve against the stress of said spring, a pair of air-pressure-tight capsules mounted on said casting, a pair of active elements one located in the interior of each of said capsules and dividing it into two compartments, a pair of beams each pivotly mounted on a separate one of said capsules and projecting through the wall thereof, a pair of connections each between one of said active elements and the inner end of one of said beams, and a drive rod mounted on and having pivotal connection with the outer end of each of said beams and forming the output element of the controller.

19. In an air-pressure-operated controller, first means responsive to the difference between two pressures, one of said pressures having varying values representing a process variable, the other of said pressures being adjustable to a constant value representing a set point, second means controlling the pressure of a supply of air, a feedback means responsive to the difference between two feedback pressures produced by said second means, one of said feedback pressures having varying values representing positive feedback, the other of said feedback pressures having varying values representing negative feedback, said feedback pressures being applied to said feedback means in opposite directions, a beam mounted so as to be rocked in one plane by said first means, a second beam mounted so as to be rocked in another plane by said feedback means, a drive rod pivotally connected to one end of each of said beams and having operative engagement with said second means to operate said second means to control the pressure of said supply of air, and reset means which varies the application of said supply of air to one side of said feedback means in accordance with the duration of the time of the deviation between the process variable and the set point.

References Cited in the file of this patent
UNITED STATES PATENTS

| | | |
|---|---|---|
| 2,662,394 | McMahon | Dec. 15, 1953 |
| 2,776,670 | Hunt | Jan. 8, 1957 |
| 2,785,696 | Le Van | Mar. 19, 1957 |
| 2,806,480 | Bowditch | Sept. 17, 1957 |
| 2,808,725 | Boothe et al. | Oct. 8, 1957 |
| 2,907,338 | Watrous | Oct. 6, 1959 |

FOREIGN PATENTS

| | | |
|---|---|---|
| 884,757 | France | May 8, 1943 |